US009684293B2

(12) United States Patent
Barrow et al.

(10) Patent No.: US 9,684,293 B2
(45) Date of Patent: Jun. 20, 2017

(54) REFRIGERANT RELIEF VALVE MONITORING SYSTEM AND METHOD (71) Applicant: BRT, LLC, Sharpsburg, GA (US)

(72) Inventors: William E. Barrow, Newnan, GA (US); Michael A. Barrow, Sharpsburg, GA (US); Elizabeth Barrow Moore, Newnan, GA (US)

(73) Assignee: BRT, LLC, Sharpsburg, GA (US)

( * ) Notice: Subject to any disclaimer, the term of this patent is extended or adjusted under 35 U.S.C. 154(b) by 320 days.

(21) Appl. No.: 14/556,572

(22) Filed: Dec. 1, 2014

(65) Prior Publication Data

US 2016/0053905 A1    Feb. 25, 2016

Related U.S. Application Data (60) Provisional application No. 62/039,630, filed on Aug. 20, 2014.

(51) Int. Cl.
| G05D 7/00 | (2006.01) |
| G05D 11/02 | (2006.01) |
| G05B 15/02 | (2006.01) |
| F16K 37/00 | (2006.01) |
| G01F 1/34 | (2006.01) |
| G01F 25/00 | (2006.01) |
| G01F 1/36 | (2006.01) |

(52) U.S. Cl.
CPC ............ G05B 15/02 (2013.01); F16K 37/005 (2013.01); G01F 1/34 (2013.01); G01F 1/36 (2013.01); G01F 25/0053 (2013.01)

(58) Field of Classification Search
CPC .......... G01F 1/34; G01F 1/36; G01F 25/0053; F16K 37/005
USPC ....................................... 700/1, 14, 203, 282
See application file for complete search history.

(56) References Cited

U.S. PATENT DOCUMENTS

| 4,059,017 | A |  | 11/1977 | Settlemyer et al. |
| 5,333,642 | A |  | 8/1994 | Kemp et al. |
| 5,364,262 | A |  | 11/1994 | Phillips |
| 6,283,138 | B1 |  | 9/2001 | Friend et al. |
| 6,581,412 | B2 |  | 6/2003 | Pant et al. |
| 6,672,151 | B1 |  | 1/2004 | Schultz et al. |
| 7,711,500 | B1 |  | 5/2010 | Killion et al. |
| 7,890,276 | B2 |  | 2/2011 | Killion et al. |
| 8,000,909 | B2 |  | 8/2011 | Danzy |
| 2002/0029808 | A1 |  | 3/2002 | Friend et al. |
| 2011/0220209 | A1 | * | 9/2011 | Schori ................ B01F 3/04794 137/2 |
| 2011/0301881 | A1 |  | 12/2011 | Danzy |

(Continued)

Primary Examiner — Michael J Brown
(74) Attorney, Agent, or Firm — Smith Gambrell & Russell LLP (57) ABSTRACT A relief valve monitoring system and method can monitor the pressure in a pressure vessel in an ammonia refrigeration system and warn of an impending overpressure condition and a possible subsequent ammonia release event through a pressure relief valve. If a pressure relief valve opens, the relief valve monitoring system and method can identify the relief valve that has opened by monitoring the downstream pressure of the relief valve, accurately determine the amount of ammonia refrigerant that has been released into a common collection header, and purge the common collection header of residual ammonia after the ammonia release event has ended.

13 Claims, 5 Drawing Sheets (56) References Cited

U.S. PATENT DOCUMENTS

| | | |
|---|---|---|
| 2013/0019952 A1 | 1/2013 | Andre et al. |
| 2014/0048158 A1 | 2/2014 | Baca et al. |
| 2014/0048255 A1 | 2/2014 | Baca et al. |
| 2014/0325983 A1* | 11/2014 | Tsunooka ............... F02D 9/02 60/602 |

* cited by examiner

Fig_4

REFRIGERANT RELIEF VALVE MONITORING SYSTEM AND METHOD

CROSS REFERENCE TO RELATED PATENT APPLICATIONS

This invention claims priority from U.S. Provisional Patent Application No. 62/039,630, filed Aug. 20, 2014, which is hereby incorporated by reference.

FIELD OF THE INVENTION

This invention relates to a relief valve monitoring system and method for monitoring the release of a pressurized gas refrigerant, particularly ammonia, from pressure vessels and more specifically a relief valve monitoring system and method that identifies the location of a relief valve among a plurality of relief valves that has opened and the amount of gas refrigerant released before the relief valve resets to a closed condition.

BACKGROUND OF THE INVENTION

Large industrial refrigeration systems conventionally employ ammonia as the refrigerant because of its heat transfer characteristics. Ammonia, however, is a hazardous Group 2 refrigerant. Because of the hazardous nature of ammonia, release of ammonia from pressure vessels in the refrigeration system is strictly regulated under OSHA and EPA regulations.

Ammonia refrigeration systems are pressurized and operate at pressures that can reach 250 pounds per square inch ("PSI") to 300 PSI. Pressure vessels in ammonia refrigeration systems conventionally have overpressure protection devices to protect the refrigeration systems from damage. The overpressure protection devices may include rupture disc devices, pressure relief valves, or pressure safety valves. When activated, the overpressure protection devices can release the ammonia to the atmosphere, into water, or into some other mitigating fluid or container.

Large industrial ammonia refrigeration systems typically have multiple pressure vessels each with at least one relief valve. The relief valves are located throughout the refrigeration system in order to assure overpressure release from the various pressure vessels in the refrigeration system. When multiple relief valves are used in an ammonia refrigeration system, any release of ammonia refrigerant from any of the relief valves is typically piped into a common collection header, and the released ammonia is either vented to atmosphere outside of the building containing the pressure vessels or piped into a dispersion tank filled with water. Importantly, the common collection header routes the release of ammonia out and away from occupied space.

In a typical industrial ammonia refrigeration system, an ammonia detector commonly referred to as a "sniffer" is located in the common collection header to detect the presence of ammonia in the common collection header and thus detect that a relief valve somewhere in the refrigeration system has opened or is leaking. With the use of a common collection header for multiple relief valves and a sniffer, identifying the location of the pressure vessel experiencing an overpressure condition and the release of ammonia through a particular relief valve becomes virtually impossible because the ammonia quickly fills the entire common collection header before the sniffer detects the presence of ammonia in the common collection header. If the overpressure condition has subsided and the relief valve has reseated, pinpointing the location of the relief valve that released the ammonia or the cause of the release of the ammonia is also virtually impossible.

Further, in existing industrial ammonia refrigeration systems, ammonia will often remain in the common collection header after the release event has ended. The residual ammonia in the collection header can create subsequent false alarms triggered by the sniffer and create a hazard to personnel that might come into contact with the outlet of the common collection header even after the ammonia release event has ended.

Importantly, for each ammonia release event, the operator of the refrigeration system must account for the amount of ammonia released as a result of the ammonia release event in order to comply with current federal and industry regulatory compliance standards. In existing industrial ammonia refrigeration systems, measuring the amount of ammonia released is at best an inaccurate estimate. Because industrial ammonia refrigeration systems use standard release valves, determining the flow through a standard release valve during the ammonia release event is either unknown or poorly characterized. Further, determining the duration of the ammonia release event can be inaccurate because of the inaccuracy of the sniffers. While specialized release valves may be employed to more accurately determine the duration of an ammonia release event, the added cost makes such a solution unattractive and does not address the question of the flow rate through such release valves during the ammonia release event.

SUMMARY OF THE INVENTION

Consequently, the relief valve monitoring system and method of the present invention can in the first instance monitor the pressure in the pressure vessels in an ammonia refrigeration system and warn of an impending overpressure circumstance and a possible subsequent ammonia release event through a pressure relief valve. In addition, the relief valve monitoring system and method of the present invention can immediately identify the relief valve that has opened as a result of an overpressure condition, accurately determine the amount of ammonia refrigerant that has been released into the collection header, and purge the common collection header of residual ammonia after the ammonia release event has ended.

The relief valve monitoring system and method of the present invention includes the installation of an upstream pressure sensor adjacent the upstream inlet of each pressure relief valve and a downstream pressure sensor adjacent the downstream outlet of each pressure relief valve in the refrigeration system. The upstream pressure sensor produces an upstream pressure sensor signal indicative of the upstream pressure at the upstream inlet of each relief valve and therefore in the associated pressure vessel. The downstream pressure sensor produces a downstream pressure sensor signal indicative of the downstream pressure at the downstream outlet of each relief valve.

A control module receives the upstream pressure sensor signal and the downstream pressure sensor signal from the pressure sensors adjacent each relief valve in the refrigeration system. By continuously monitoring the upstream pressure sensor signal associated with each relief valve and associated pressure vessel, the control module can determine when a particular pressure vessel is approaching an overpressure condition that might exceed the specified valve threshold pressure and thereby trigger the opening of the relief valve. Based on that monitoring, the control module can identify the pressure vessel and set an alarm showing various stages as the monitored pressure in the pressure vessel approaches the trigger pressure for the relief valve. Such an alarm system allows an operator to investigate the circumstances that might be causing an increase in pressure in a particular pressure vessel. In order to improve the accuracy of monitoring the downstream pressure sensor signal, an atmospheric pressure sensor is located outside of the enclosure in which the pressure vessels are located and produces an atmospheric pressure sensor signal indicative of atmospheric pressure. The atmospheric pressure sensor signal provides a baseline for accurately determining the downstream pressure at each pressure relief valve in the refrigeration system.

In the event a relief valve opens in response to overpressure, i.e. pressure exceeding the specified valve threshold pressure, in the relief valve's associated pressure vessel, the downstream pressure at the downstream relief valve outlet increases, and the downstream pressure sensor signal from the downstream pressure sensor of the open relief valve communicates that rising downstream pressure to the control module. Based on that rise in the downstream pressure, the control module determines whether the downstream pressure has risen above a predetermined threshold thereby indicating that the relief valve has opened. Once the control module receives the downstream pressure sensor signal indicating that the relief valve has opened, the control module starts a timer in order to measure the duration of the ammonia release event. At the same time, the control module begins timing and recording the time segments between each incremental change in the upstream pressure at the upstream relief valve inlet. For each incremental change in the upstream pressure, the control module records the duration of the time segment and calculates the amount of ammonia released during that time segment based on the predetermined ammonia flow characteristics of the relief valve as a function of upstream pressure. The control module continues to measure the upstream pressure and calculate the amount of ammonia released for each time segment between incremental changes in the upstream pressure until the downstream pressure indicates that the release event has ended. Once the release event has ended, the control module adds all of the incremental amounts of lost ammonia together to determine the total amount of ammonia released during the release event.

Because existing ammonia refrigeration systems have a common collection header and a collection header sniffer, the relief valve monitoring system and method of the present invention includes a purge system that purges residual ammonia from the common collector header and the downstream outlets of all of the relief valves in order to eliminate false alarms from the sniffer after an ammonia release event has ended. Particularly, for each relief valve in the ammonia refrigeration system, a purge pipe has one end connected to the downstream relief valve outlet of the relief valve and the other end connected to a source of compressed gas via a purge valve. Once the ammonia release event has ended, the control module opens all of the purge valves for a predetermined time in order to displace the residual ammonia from the common collection header and the downstream piping associated with each relief valve. Consequently, the relief valve monitoring system and method of the present invention is particularly adapted for retrofitting existing ammonia refrigeration systems with standard release valves, a common collection header, and a common collection header sniffer.

Further objects, features and advantages will become apparent upon consideration of the following detailed description of the invention when taken in conjunction with the drawings and the appended claims.

DETAILED DESCRIPTION OF THE PREFERRED EMBODIMENT

Figure 1:
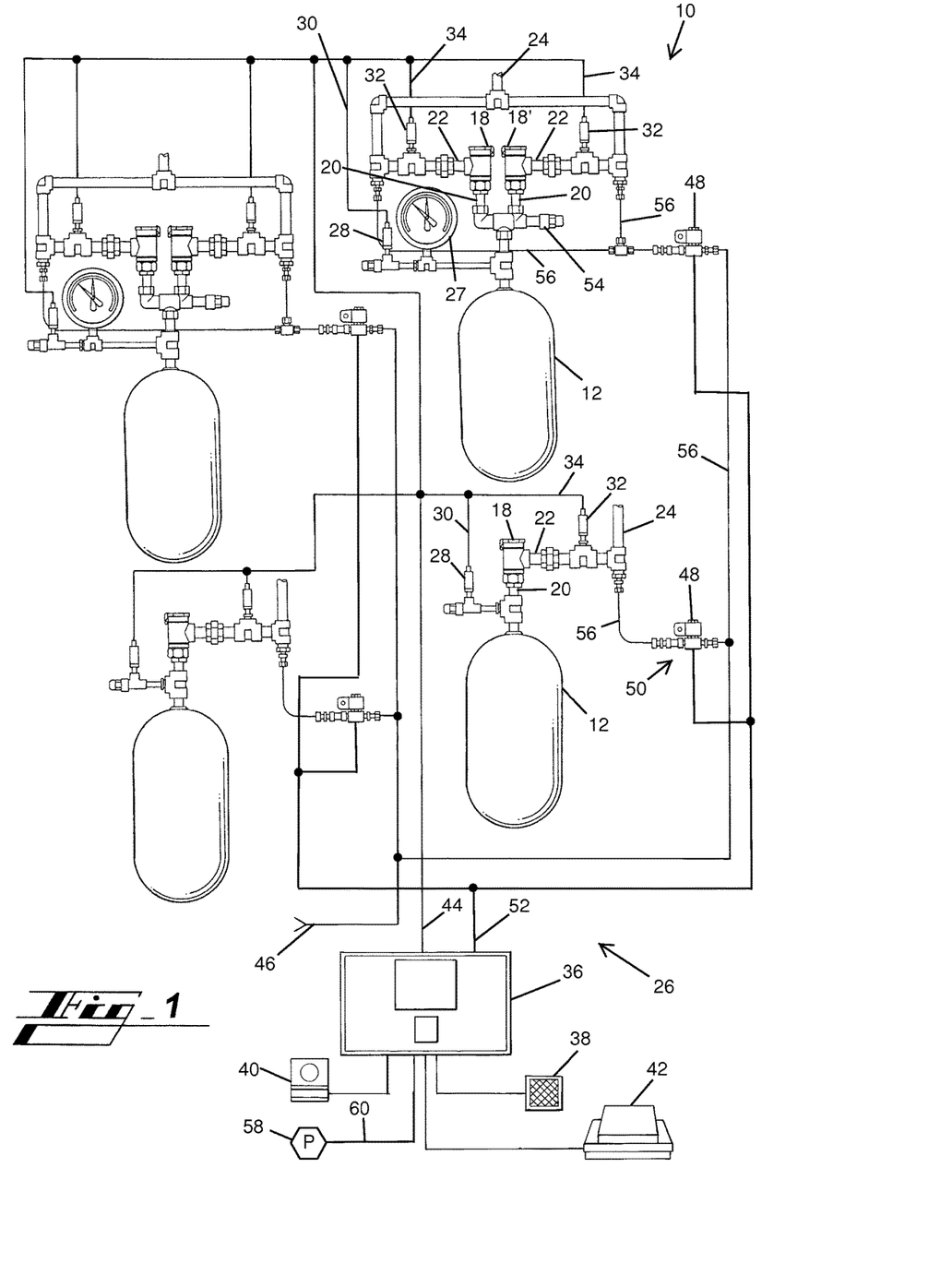
FIG. 1 is a schematic diagram of a refrigeration system that includes a relief valve monitoring system in accordance with the present invention.
Figure 2:
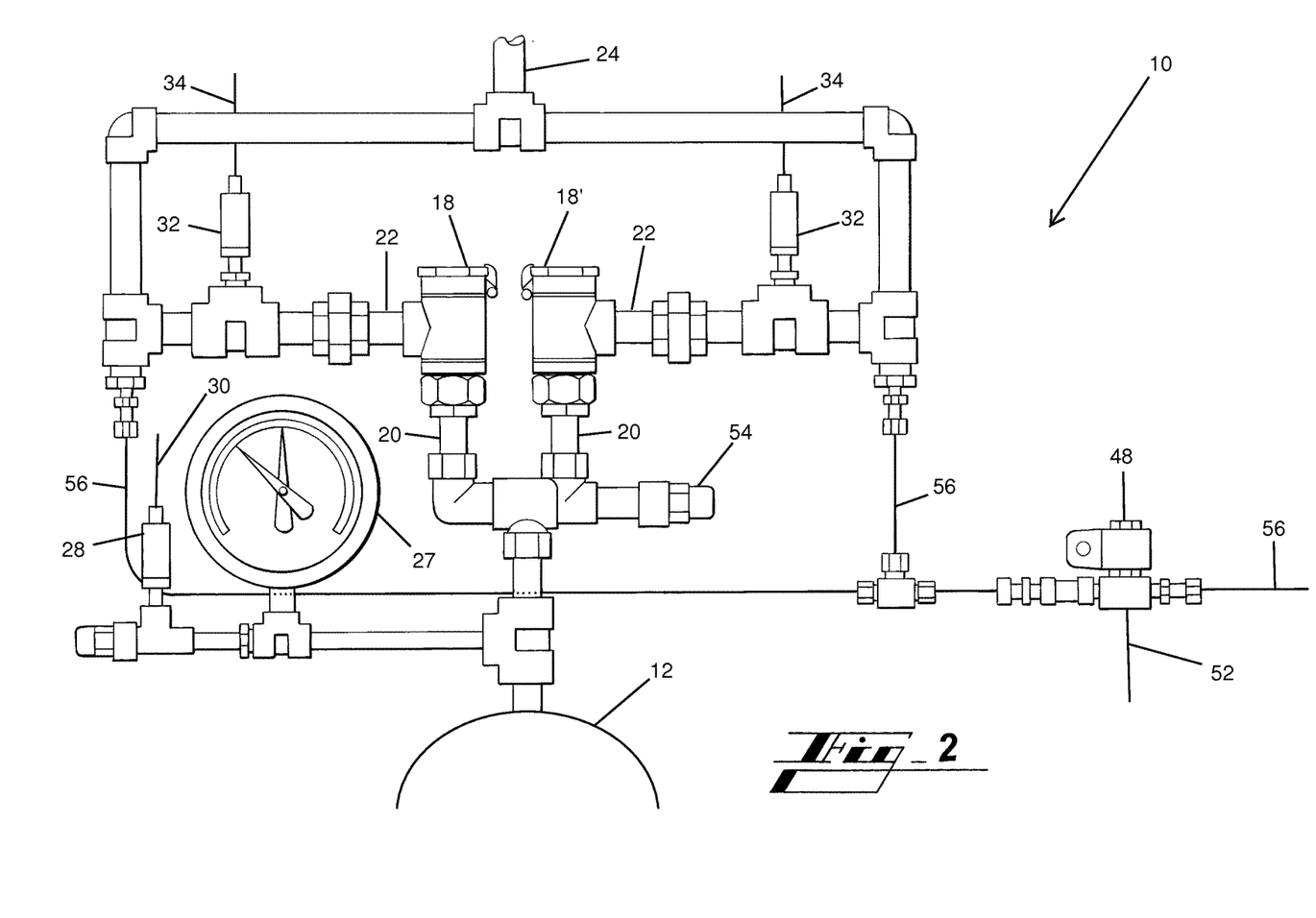
FIG. 2 is a schematic view of a pressure vessel with dual relief valves that is part of the refrigeration system that includes the relief valve monitoring system in accordance with the present invention.
Figure 3:
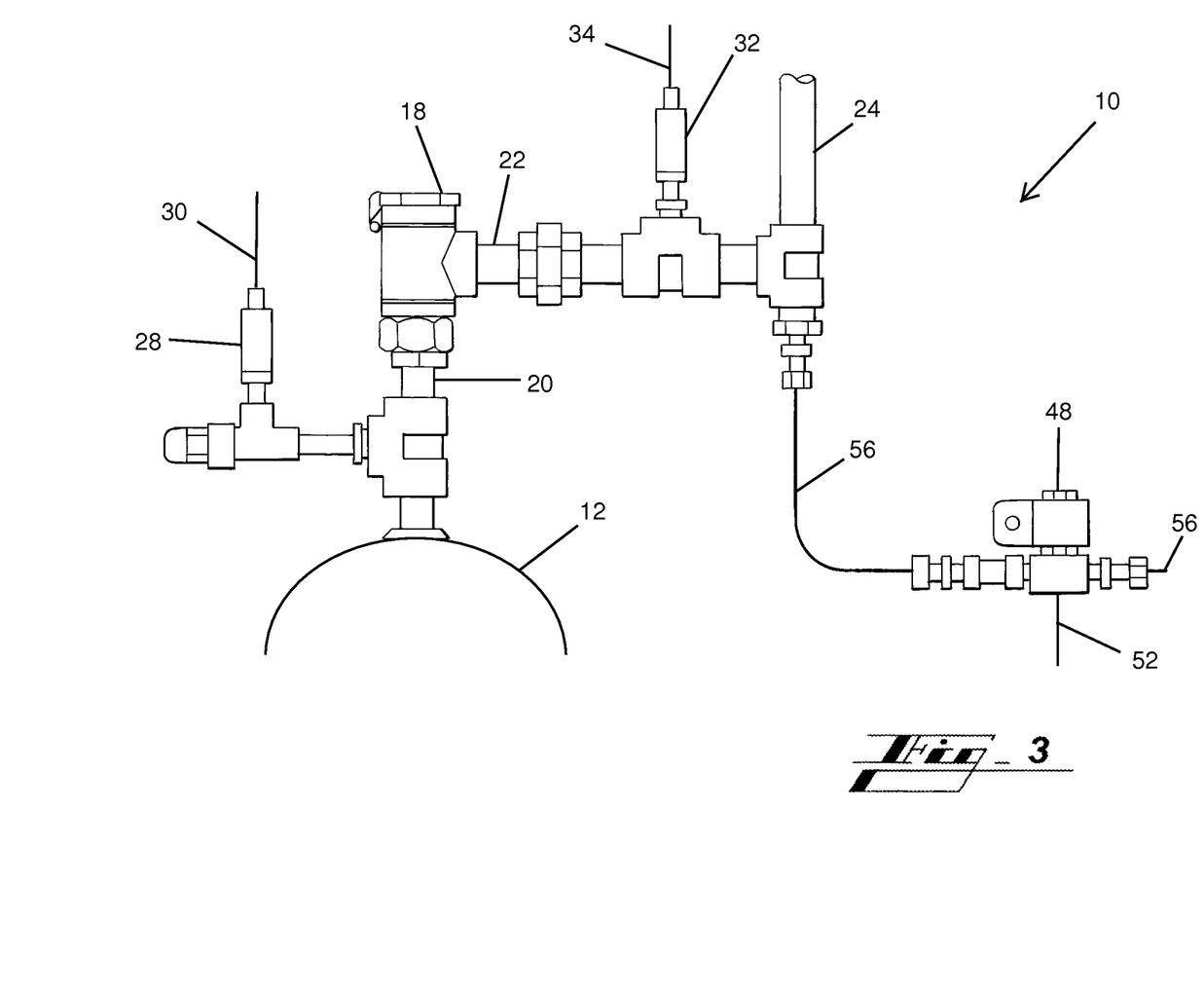
FIG. 3 is a schematic view of a pressure vessel with single relief valve that is part of the refrigeration system that includes the relief valve monitoring system in accordance with the present invention.

Turning to FIGS. 1-3, a refrigeration system 10 comprises various pressure vessels 12 containing a pressurized gas refrigerant, typically ammonia for large industrial refrigeration systems. As previously described, such pressure vessels 12 typically are pressurized and operate at pressures that can reach 250 PSI to 300 PSI. In order to ensure safety, each pressure vessel 12 is equipped with one or more relief valves 18. Each relief valve 18 has an upstream relief valve inlet 20 connected to the pressure vessel 12 and a downstream relief valve outlet 22 connected to a collection header 24. Each collection header 24 is then connected to a common collection header (not shown). When the relief valve 18 opens, the gas in the pressure vessel 12 is exhausted through the open relief valve 18, through the collection header 24, and into the common collection header. From the common collection header the gas refrigerant is either vented to atmosphere outside of the building containing the pressure vessel or piped into a dispersion tank filled with water.

FIG. 2 discloses a redundant relief dual valve configuration, and FIG. 3 shows a single relief valve configuration. The dual relief valve configuration shown in FIG. 2 includes relief valve 18 and relief valve 18'. A switching valve 54 can connect the pressure vessel 12 to relief valve 18 only, to relief valve 18' only, or to both. Those connections allow for replacement of one of the relief valves 18 or 18' while the refrigeration system 10 is in operation and the pressure vessel 12 remains under pressure. Replacement of the relief valve 18 in the single relief valve configuration shown in FIG. 3 requires the refrigeration system 10 to be shut down during the replacement of the relief valve 18. Each relief valve 18 may also have an upstream pressure gauge 27 so that maintenance personnel can observe the pressure inside the pressure vessel 12.

In order to identify a relief valve 18 that has opened and to determine the amount of gas refrigerant that has been exhausted through the relief valve 18 while the relief valve 18 is open, a relief valve monitoring system 26 of the present invention is employed. The relief valve monitoring system 26 comprises an upstream pressure sensor 28 connected to the upstream relief valve inlet 20 for monitoring the upstream pressure to the relief valve 18 and producing an upstream pressure sensor signal 30 indicative of the upstream pressure and a downstream pressure sensor 32 connected to the downstream relief valve outlet 22 for monitoring the downstream pressure from the relief valve 18 and producing a downstream pressure sensor signal 34 indicative of the downstream pressure. The upstream pressure sensor signal 30 and the downstream pressure sensor signal 34 are connected to the control module 36 by means of a relief valve data bus 44. A display 38, an alarm 40, and a printer 42 are connected to and operated by the control module 36.

In operation, the relief valve monitoring system 26 is able to monitor the pressure in each of the pressure vessels 12 of the refrigeration system 10, to identify a particular relief valve 18 that has opened in response to an overpressure condition in its associated pressure vessel 12, and to determine the amount of gas refrigerant that has escaped while the relief valve 18 is open. In order to monitor the pressure in each of the pressure vessels 12, the control module 36 receives the upstream pressure sensor signal 30 from the upstream pressure sensor 28 along with an identification of the relief valve associated with a particular upstream pressure sensor 28 via the relief valve data bus 44. By continuously monitoring the upstream pressure sensor signal 30 associated with each relief valve 18, the control module 36 can determine when a particular pressure vessel 12 is approaching an overpressure condition that might trigger the opening of the relief valve 18. Based on that monitoring, the control module 36 can identify the relief valve 18 and its associated pressure vessel 12 that is approaching an overpressure condition and set the alarm 40. Particularly, the control module 36 can display the monitored pressures on the display 38 as the pressure vessel 12 approaches the trigger pressure for the relief valve 18. Thereby, the relief valve monitoring system 26, with display 38 and the alarm 40, allows an operator to investigate the circumstances that might be causing an increase in pressure in a particular pressure vessel 12 connected to a particular relief valve 18.

In the event that one of the relief valves 18 opens in response to overpressure in its associated pressure vessel 12, the relief valve monitoring system 26 can identify the relief valve that has opened, can determine the amount of gas refrigerant that has escaped while the relief valve 18 is open, and can purge the common collection header (not shown) of any residual gas refrigerant before the relief valve monitoring system 26 resets. The control module 36 of the relief valve monitoring system 26 determines that a particular relief valve 18 has opened by monitoring the downstream pressure sensor signal 34 on the relief valve data bus 44 and comparing the downstream pressure sensor signal 34 to a predetermined release event threshold pressure. When a particular relief valve 18 opens, the downstream pressure at the downstream relief valve outlet 22 increases. The downstream pressure sensor 32 senses the increase in downstream pressure at the downstream relief valve outlet 22, which in turn generates the downstream pressure sensor signal 34. The control module 36 compares the downstream pressure sensor signal 34 to the predetermined pressure threshold, and thereby determines that the relief valve 18 is open.

Figure 4:
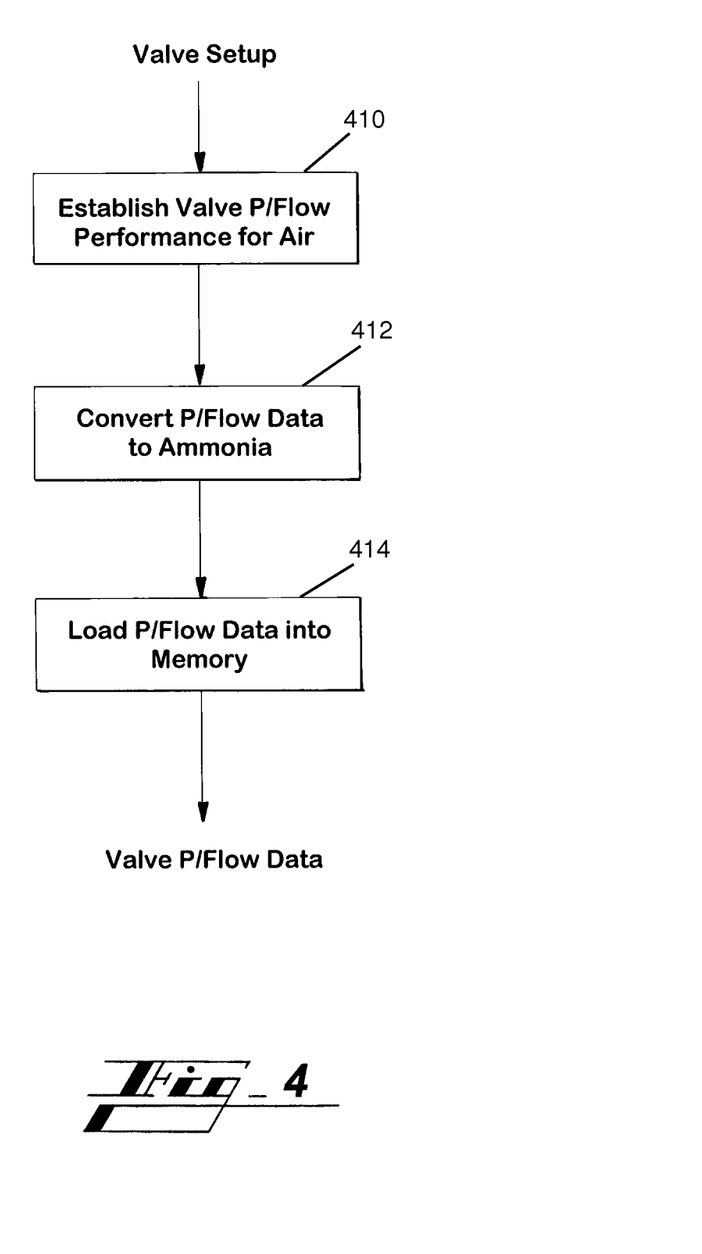
FIG. 4 is a block diagram illustrating a method for determining a relief valve flow characteristics for ammonia for monitoring a relief valve in accordance with the present invention.

Once the control module 36 receives the downstream pressure sensor signal 34 indicating that the particular relief is open, the control module 36 identifies the particular relief valve 18 and starts a timer in order to measure the duration of the gas refrigerant release event. At the same time, the control module 36 begins recording the upstream pressure by means of the upstream pressure sensor signal 30. For each incremental change in the upstream pressure at the open relief valve 18, the control module 36 captures the duration of the time segment between the incremental pressure changes and calculates the amount of gas refrigerant released during that time segment based on the flow rate of the relief valve as a function of the upstream pressure. As illustrated in FIG. 4, the flow rate for the relief valves 18 as a function of upstream pressure is determined empirically for each of the relief valves 18 in the refrigeration system 10, and the flow rates as a function of pressure for each of the relief valves 18 in the refrigeration system 10 are loaded into the memory of the control module 36 for use in the calculation of the amount of released gas refrigerant. After the relief valve 18 is opened, the control module 36 continues to measure the upstream pressure at the open relief valve 18 and to calculate and store the amount of gas refrigerant released for each incremental change in upstream pressure until the downstream pressure sensor signal 34 drops indicating that the relief valve 18 has closed and therefore that the gas refrigerant release event has ended. Once the release event has ended, the control module 36 sums all of the stored incremental amounts of lost gas refrigerant for each incremental change in upstream pressure to determine the total amount of gas refrigerant released during the release event.

Figure 5:
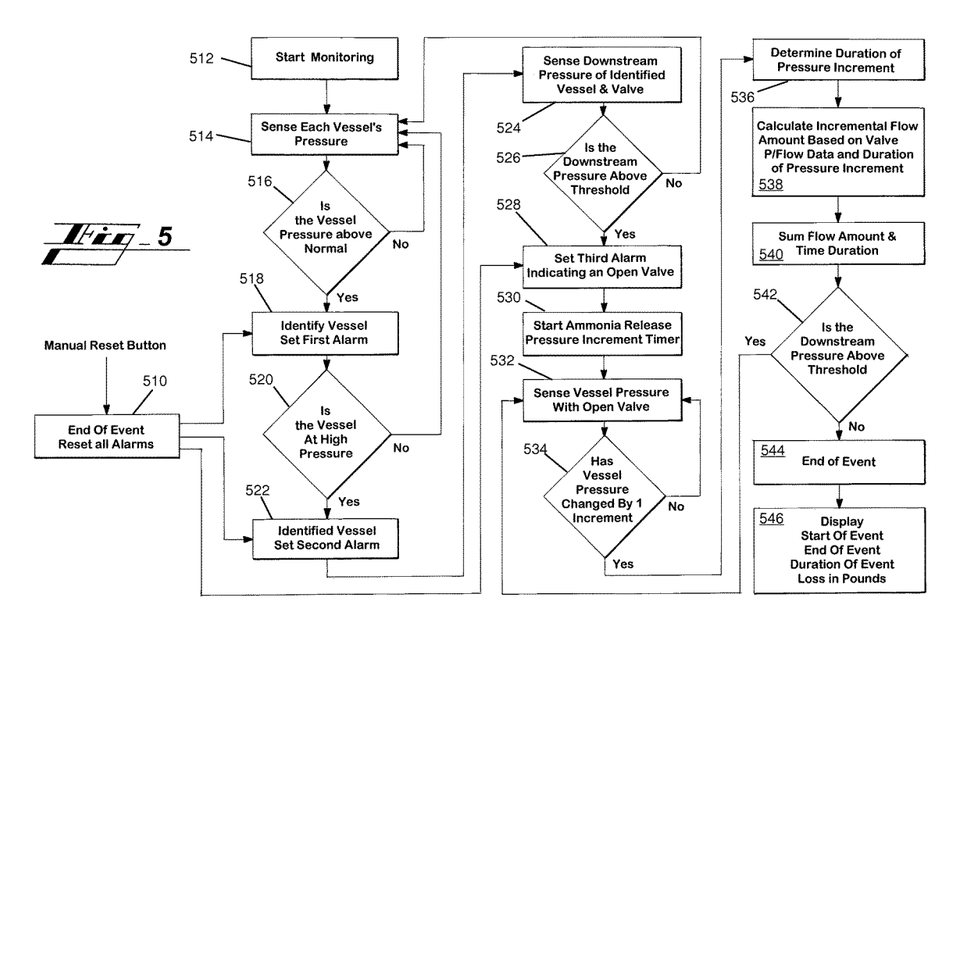
FIG. 5 is a block diagram illustrating a method for monitoring a relief valve in accordance with the present invention.

The method of the present invention is further illustrated in FIGS. 4 and 5. With respect to FIG. 4, for each standard relief valve 18 in the refrigeration system 10, the flow rate of the relief valve 18 as a function of upstream pressure is first determined empirically for air at step 410. At step 412 the flow rate of air as a function of upstream pressure is converted from air to ammonia or to any other gas refrigerant that may be used in the refrigeration system 10. Once the flow rate through the relief valve 18 for the gas refrigerant (ammonia) has been determined at step 412, that flow rate data is loaded into the memory of the control module 36 at step 414 for use in calculating the amount of gas refrigerant lost during gas refrigerant release event.

Turning to FIG. 5, the monitoring method of the present invention begins with a manual reset 510 of the relief valve monitoring system 26. The reset step 510 resets the first alarm at step 518, a second alarm at step 522, and the third alarm at step 528. The monitoring method of the relief valves 18 in the refrigeration system 10 begins at step 512 and proceeds to step 514. At step 514, the control module 36 receives the upstream pressure sensor signal 30 from each of the relief valves 18 and therefore determines the pressure in each pressure vessel 12 in the refrigeration system 10. For each relief valve 18, the method moves to step 516 where the control module 36 determines whether the upstream pressure at the upstream relief valve inlet 20 (the same pressure as the pressure in the associated pressure vessel 12) is above normal. If the upstream pressure at the upstream relief valve inlet 20 is not above normal, the method follows the "no" branch and continues to monitor the upstream pressure for each pressure vessel 12. If, on the other hand, the upstream pressure at the upstream relief valve inlet 20 is above normal, the method follows the "yes" branch to step 518. At step 518, the control module 36 identifies the relief valve 18 and its associated pressure vessel 12 that has a pressure above normal and sets a first alarm in order to alert an operator of an impending overpressure condition.

From step 518, the method proceeds to step 520 where the control module 36 determines if the upstream pressure at the upstream relief valve inlet 20 of the relief valve 18 and in the pressure vessel 12 identified in step 518 has increased to a predetermined high pressure. If the upstream relief valve inlet 20 and the pressure vessel 12 identified in step 518 have not reached the predetermined high pressure, the method follows the "no" branch back to step 514, and the control module 36 continues monitoring the pressures in all of the pressure vessels 12 in the refrigeration system 10. If, on the other hand, the upstream relief valve inlet 20 and the pressure vessel 12 identified in step 518 have reached the predetermined high pressure, the method follows the "yes" branch to step 522. At step 522, the control module 36 sets a second alarm to alert an operator that the upstream relief valve inlet 20 and the pressure vessel 12 identified in step 518 have progressed to a predetermined second level of high pressure.

From step 522, the method of the present invention proceeds to step 524 where the control module 36 monitors the downstream pressure sensor signal 34 in order to determine the downstream pressure at the downstream relief valve outlet 22. From step 524, the method proceeds to step 526 where the control module 36 determines whether the downstream pressure at the downstream relief valve outlet 22 exceeds a predetermined threshold. If the downstream pressure at the downstream relief valve outlet 22 has not exceeded the predetermined threshold pressure, the method follows the "no" branch back to step 514, and the monitoring method continues. If, on the other hand, the downstream pressure at the downstream relief valve outlet 22 has exceeded the predetermined threshold pressure, the method follows the "yes" branch to step 528 where a third alarm is set indicating that the identified relief valve 18 has opened. From step 528, the method proceeds to step 530 where the control module 36 starts an incremental time segment timer. Once the incremental time segment timer is started at step 530, the method proceeds to step 532 where the control module 36 senses and records the upstream pressure at the upstream relief valve inlet 20 of the open relief valve 18, which is the same pressure as the pressure in the pressure vessel 12.

From step 532, the method proceeds to step 534 where the control module 36 determines whether upstream pressure at the upstream relief valve inlet 20 has changed by one increment. An increment can be of any predetermined size. In an embodiment of the present invention, an increment equals one PSI. Obviously, the smaller the increments are; the more accurate the calculation of the amount of lost gas refrigerant will be. If the upstream pressure at the upstream relief valve inlet 20 has not changed by one increment, the method follows the "no" branch and returns to step 532, and the control module 36 continues to monitor the upstream pressure while the control module 36 continues to time the time segment between the incremental upstream pressure changes. If, on the other hand, the upstream pressure at the upstream relief valve inlet 20 has changed by one increment, the method follows the "yes" branch and proceeds to step 536. At step 536, the control module 36 determines the duration of the time segment during which the upstream pressure changes by one increment.

From step 536, the method proceeds to step 538 where the control module 36 calculates the amount of gas refrigerant released through the relief valve 18 for the time segment associated with one increment change in the upstream pressure. Particularly, the control module 36 multiplies the duration of the time segment by the particular flow rate for the upstream pressure to yield an amount of gas refrigerant release during time segment for the pressure increment. As previously described with respect to FIG. 4, the flow rate as a function of upstream pressure for the particular open relief valve 18 is determined empirically prior to implementation of the relief valve monitoring system 26, and the flow rate as a function of pressure data is stored in the memory of the control module 36 for retrieval to make the calculation of the amount of gas refrigerant released for the particular open relief valve 18. From step 538, the method proceeds to step 540 where the control module 36 sums the amounts of gas refrigerant released during all of the previous time segments.

From step 540, the method proceeds to step 542 where the control module 36 checks to determine if the downstream pressure of the relief valve 18 remains above the pressure threshold indicating that the relief valve 18 is still open. If the relief valve 18 is still open, the method follows the "yes" branch, the method returns to step 532, and the method cycles through steps 532-540 as previously described. If, on the other hand, the downstream pressure has fallen below the pressure threshold, indicating that the relief valve 18 has reset and closed, the method follows the "no" branch and proceeds to step 544, which is the end of the gas refrigerant release event. Finally, the method proceeds from step 544 to step 546, and at step 546, the control module 36 generates a display and print out of the start time of the release event, the end time of the release event, the duration of the release event, and the loss in pounds of the gas refrigerant.

In order to improve the accuracy of monitoring the downstream pressure sensor signal, an atmospheric pressure sensor 58 is located outside of the enclosure in which the pressure vessels are located and produces an atmospheric pressure sensor signal 60 indicative of atmospheric pressure. The atmospheric pressure sensor signal provides a baseline for accurately determining the threshold for the downstream pressure at each pressure relief valve in the refrigeration system. For example in step 526 of FIG. 5, the atmospheric pressure is used to set the threshold for identifying the opening of the relief valve 18. The baseline atmospheric pressure provides a location specific reference, relating to altitude or weather, for comparing signals from all downstream pressure sensors 32 connected to the relief valve collection headers 24. In addition under certain "leakage or seepage" conditions through one of the relief valves 18, trace amounts of ammonia associated with a faulty or not properly seated relief valve 18 could be detected early, and an alarm condition could be enabled in an effort to mitigate even a small amount of leakage associated with a relief valve 18. In addition, as a reliability and confidence enhancement, the atmospheric pressure sensor 58 acts as a cross check for all downstream pressure sensors 32 and can trigger a proactive response to a potential pressure sensor failure.

The relief valve monitoring system 26 of the present invention is particularly adapted for retrofitting existing refrigeration systems 10 that already have existing standard release valves 18 and a common collection header with ammonia sniffers (not shown) in the common collection header to detect the presence of ammonia and thereby trigger an alarm. Because the existing ammonia refrigeration systems 10 have a common collection header and common collection header sniffers, the relief valve monitoring system 26 and method of the present invention includes a purge system 50 that purges residual ammonia from the common collector header and the downstream relief valve outlets 22 of all of the relief valves 18 in order to eliminate false alarms from the sniffer after an ammonia release event has ended. The common collection header purge system 50 comprises a pressurized purging gas supply 46, typically pressurized air, purge valves 48, purge piping 56 interconnecting the pressurized purging gas supply 46, the purge valves 48, and the collection headers 24 of each of the relief valves 18. A purge data bus 52 connects the control module 36 to each of the purge valves 48. Once the ammonia release event has ended (step 544, FIG. 5), the control module 36 sends a signal on the purge data bus 52 to all of the purge valves 48 in order to open the purge valves 48 for a predetermined time and thereby displace the residual ammonia from the collection headers 24, the common collection header (not shown), and the downstream relief valve outlet 22 of each relief valve 18.

While this invention has been described with reference to preferred embodiments thereof, it is to be understood that variations and modifications can be affected within the spirit and scope of the invention as described herein and as described in the appended claims.

We claim:

1. A relief valve monitoring system for monitoring a relief valve having an upstream relief valve inlet connected to a pressure vessel containing a pressurized gas, a downstream relief valve outlet connected to a collection header, wherein the relief valve has a specified upstream valve threshold pressure for opening the relief valve and a predetermined flow rate as a function of upstream pressure at the upstream relief valve inlet when the relief valve is opened in response to the upstream pressure exceeding the specified upstream valve threshold pressure, the monitoring system comprising:
   a. an upstream pressure sensor in communication with the upstream relief valve inlet for monitoring the upstream pressure to the relief valve and producing an upstream pressure sensor signal indicative of the upstream pressure;
   b. a downstream pressure sensor in communication with the downstream relief valve outlet for monitoring downstream pressure from the relief valve and producing a downstream pressure sensor signal indicative of the downstream pressure at the downstream relief valve outlet; and
   c. a control module programmed to calculate the amount of gas released when the relief valve opens in response to the upstream pressure exceeding the specified upstream valve threshold pressure, the steps including:
      i. determining a start time when the relief valve opens based on an increase in the downstream pressure to an event threshold pressure as indicated by the downstream pressure sensor signal from the downstream pressure sensor;
      ii. continuously monitoring the upstream pressure based on monitoring the upstream pressure sensor signal from the upstream pressure sensor while the relief valve is open;
      iii. determining an end time when the relief valve closes based on a decrease in the downstream pressure below the event threshold pressure as indicated by the downstream pressure sensor signal from the downstream pressure sensor;
      iv. determining a time duration of the relief valve being open by comparing start time to the end time; and
      v. calculating the amount of gas released while the relief valve was open based on the predetermined flow rate of the relief valve as a function of the upstream pressure while the relief valve was open.

2. The relief valve monitoring system of claim 1, wherein the relief monitoring system further includes two relief valves connected to the upstream relief valve inlet by means of a switching valve that can alternatively connect the upstream relief valve inlet to either of the two relief valves.

3. The relief valve monitoring system of claim 1, wherein the control module continuously monitors the upstream pressure and produces an alarm when the upstream pressure approaches the specified upstream valve threshold pressure of the relief valve.

4. The relief valve monitoring system of claim 1, wherein the control module divides the time duration into time segments defined by an incremental change in the upstream pressure, calculates the amount of gas released for each time segment based on the flow rate as a function of the upstream pressure of the relief valve for each time segment, and sums the amount of gas released for all of the time segments during the time duration of the relief valve being open.

5. The relief valve monitoring system of claim 4, wherein the incremental change in pressure is 1 pound per square inch.

6. The relief valve monitoring system of claim 1, wherein the relief valve monitoring system further includes a collection header purge system comprising:
   a. a source of pressurized purging gas; and
   b. a purge valve connected between the source of pressurized purging gas and the downstream relief valve outlet of the relief valve,
   wherein the control module controls the operation of the purge valve to purge the collection header of the gas from the pressure vessel after the release event has ended.

7. The relief valve monitoring system of claim 1, wherein the relief valve monitoring system further includes an atmospheric pressure sensor for establishing a baseline reference for determining the event threshold pressure for each relief valve.

8. A method for monitoring a relief valve having an upstream relief valve inlet connected to a pressure vessel containing a pressurized gas, a downstream relief valve outlet connected to a collection header, wherein the relief valve has a specified upstream valve threshold pressure for opening the relief valve and a predetermined flow rate as a function of upstream pressure at the upstream relief valve inlet when the relief valve is opened in response to the upstream pressure exceeding the upstream specified valve threshold pressure, the monitoring method comprising the steps of:
   a. connecting an upstream pressure sensor to the upstream relief valve inlet for monitoring the upstream pressure to the relief valve and producing an upstream pressure sensor signal indicative of the upstream pressure;
   b. connecting a downstream pressure sensor to the downstream relief valve outlet for monitoring downstream pressure from the relief valve and producing a downstream pressure sensor signal indicative of the downstream pressure; and
   c. calculating the amount of gas released when the relief valve opens in response to the upstream pressure exceeding the specified upstream valve threshold pressure, the steps including:
      vi. determining a start time when the relief valve opens based on an increase in the downstream pressure to an event threshold pressure as indicated by the downstream pressure sensor signal from the downstream pressure sensor;
      vii. continuously monitoring the upstream pressure based on monitoring the upstream pressure sensor signal from the upstream pressure sensor while the relief valve is open;
      viii. determining an end time when the relief valve closes based on a decrease in the downstream pressure below the event threshold pressure as indicated by the downstream pressure sensor signal from the downstream pressure sensor;

ix. determining a time duration of the relief valve being open; and x. calculating the amount of gas released while the relief valve was open based on the predetermined flow rate of the relief valve as a function of the upstream pressure while the relief valve was open.

9. The method of claim 8, wherein the control module continuously monitors the upstream pressure and produces an alarm when the upstream pressure approaches the specified upstream valve threshold pressure of the relief valve.

10. The method of claim 8, wherein the control module divides the time duration into time segments defined by an incremental change in the upstream pressure, calculates the amount of gas released for each time segment based on the flow rate as a function of the upstream pressure of the relief valve for each time segment, and sums the amount of gas released for all of the time segments during the time duration of the relief valve being open.

11. The method of claim 10, wherein the incremental change in pressure is 1 pound per square inch.

12. The method of claim 8, wherein the method further includes purging the collection header by injecting a pressurized purging gas into the downstream relief valve outlet of each relief valve after the release event has ended.

13. The method of claim 8, wherein the method further includes sensing atmospheric pressure and using the atmospheric pressure to establish the event threshold pressure for the relief valve.

* * * * *